Feb. 24, 1925.
J. B. HUNT
1,527,650
ROTARY CUTTING TOOL
Filed Oct. 26, 1922
2 Sheets-Sheet 1
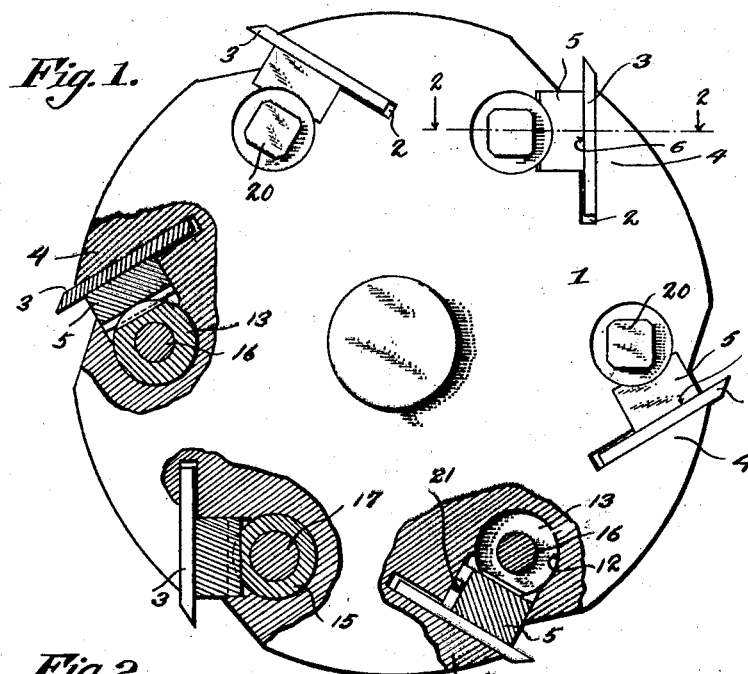
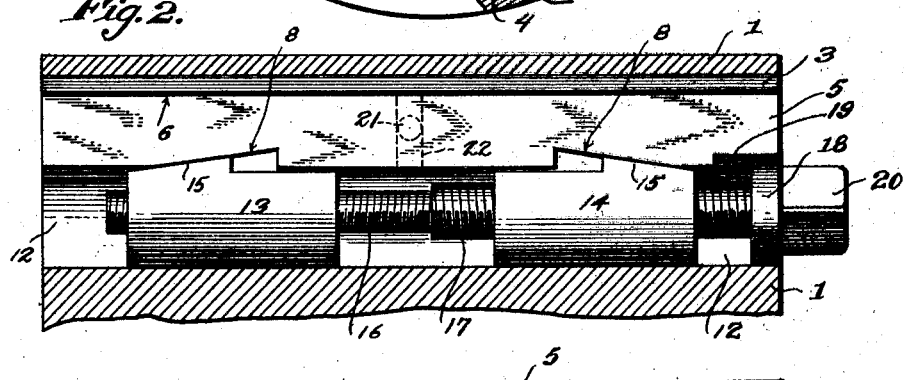
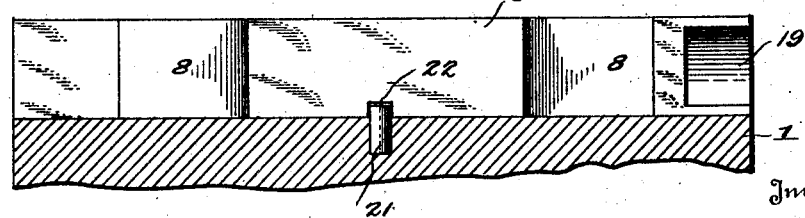

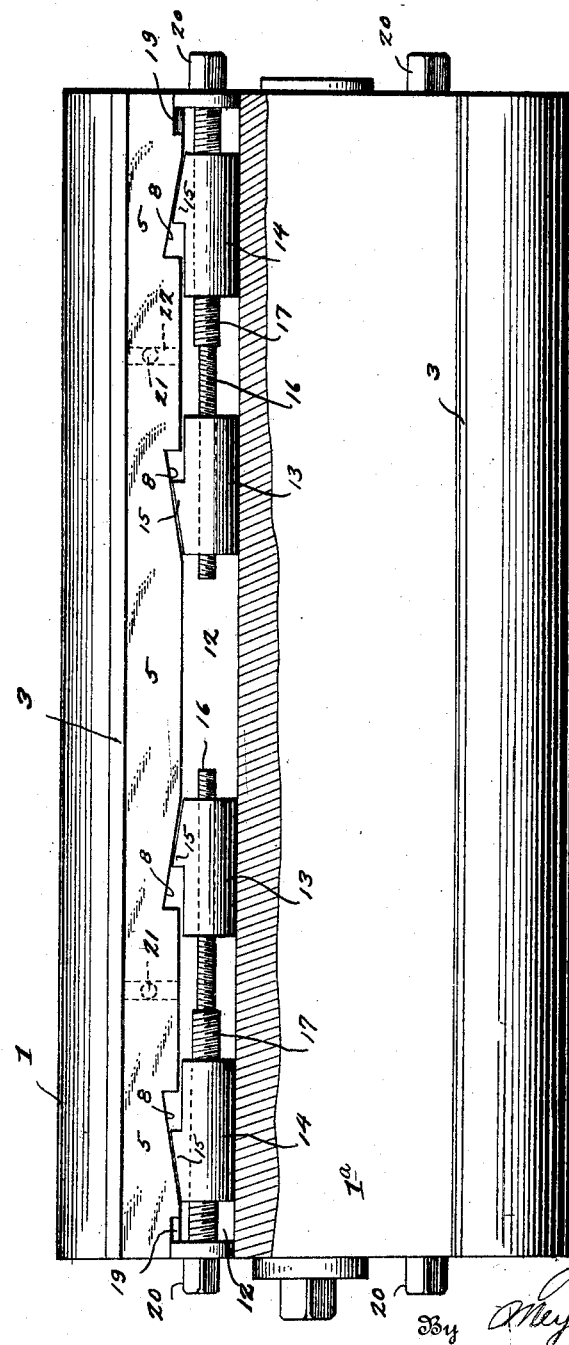

Patented Feb. 24, 1925.

1,527,650

UNITED STATES PATENT OFFICE.

JAMES B. HUNT, OF LAUREL, MISSISSIPPI.

ROTARY CUTTING TOOL.

Application filed October 26, 1922. Serial No. 596,946.

*To all whom it may concern:*

Be it known that I, JAMES B. HUNT, a citizen of the United States, and resident of Laurel, in the county of Jones and State of Mississippi, have invented certain new and useful Improvements in Rotary Cutting Tools, of which the following is a specification.

My invention relates to rotary cutting tools, such as planing cutters for wood planing machines, and it relates more particularly to improved means for clamping cutter blades adjustably in the bodies.

Among the principal objects of the invention are: to provide means for clamping blades satisfactorily in a relatively long cutter body; to provide simple and easily operated means for clamping and unclamping the blades; to provide means operated only at one point, or sometimes at only two points, for clamping each blade practically along its entire length; to provide clamping means which is very safe and secure, and not liable to be loosened in the operation of the cutter, and the parts of which cannot be displaced even if they are loosened; to provide clamping means in which recesses or openings are not likely to become clogged with wood dust or gum in such a way as to make it difficult to operate the clamping device; to arrange the body, blades and clamping means so that when desired the blades can be removed by lifting them straight out from the face of the cutter body; and in some cases to provide a head and clamp construction which permits the cutter blades to be supported almost up to the cutting edge.

The characteristics and advantages of the invention are further sufficiently described in connection with a detailed description of the accompanying drawings, which show a representative embodiment of the invention. After considering this, persons skilled in the art will understand that many variations may be made within the principles of the invention, and I contemplate the employment of any structures which are properly within the scope of the appended claims.

In the drawings:

Fig. 1 is a view of one end of a cutter embodying the invention, with parts broken away in different transverse planes to show the cross sectional construction of the clamping mechanism at different points.

Fig. 2 is a longitudinal section through the body in approximately the plane 2—2, Fig. 1, the clamping parts and blade, however, being shown in full.

Fig. 3 is a sectional view showing principally the clamping bar and dowel pin.

Fig. 4 is a side elevation of a cutter body, cutters and clamping means showing the adaptation of two sets of clamping devices, such as shown in Figs. 1, 2 and 3, for clamping one blade in a long cutter body.

The cylindrical body 1 is provided with regularly spaced slots 2, in which the cutter blades 3 are located. Portions 4 of the body at the outside of each slot constitute abutments against which the blades are clamped. Adjacent to each of the slots 2 is a recess accommodating a clamping bar 5, which has an outward flat face 6 to engage the blade and on the opposite side has recesses 7 provided with angular or beveled faces 8. The bars 5 are desirably made of substantially rectangular cross section. Adjacent to each clamping bar the body is provided with a longitudinal recess 12 accommodating the longitudinally movable wedge blocks 13 and 14 which have wedge members 15 with flattened outer faces to cooperate with the beveled faces 8 of the clamping bar. The wedge blocks are operated by a screw comprising a portion 16 having a left hand thread, and a portion 17 having a right hand thread, these portions engaging suitably threaded holes in the wedge blocks. Near one end of the body the screw porition 17 has a circular flange 18 closely fitting in the body recess 12 and in a segmental recess 19 formed in the adjacent end of the clamping bar, this flange serving to close the body recess and prevent entrance of chips or dirt. Exteriorly to the flange the screw has a polygonal head 20 to receive any suitable wrench. Desirably the clamping bar is prevented from moving endwise by a dowel pin 21 seated in the body 1 and engaging a slot 22 in one face of the bar, the pin and slot being arranged so as not to interfere with the clamping movement of the bar.

The blade is adjusted and then tightened by turning a single nut 20 for each blade, this movement of the nut serving to move the wedge blocks apart and press the clamping bar against the blade and to hold the blade against the body abutments 4 in a manner which will be obvious without further description.

Fig. 4 shows the adaptation of substantially the same clamping mechanism to a very long cutter body 1ª. Two sets of the clamping devices are used in each of the body recesses 12, these devices being arranged so that the nut 20 for operating each of them is exposed at one of the ends of the body. The parts of the clamping mechanism are identified by the same reference characters as in Figs. 1, 2 and 3, and the operation will be readily understood without detail explanation, it only being necessary to say that this arrangement provides for clamping a very long blade very securely by the manipulation of only two devices, namely the nuts 20, for each blade.

What I claim is:—

1. A rotary cutting tool comprising a body having longitudinal openings, each opening being provided with an angularly arranged inwardly presented face for clamping engagement of a substantially flat and relatively thin cutting tool, a cutting tool located in the recess against said face, a clamping member in the recess engaging the opposite face of the tool, means permitting easy removal of the clamping member and engaging it to prevent longitudinal movement, a pair of longitudinally movable clamping blocks in the recess and guided by faces thereof, the clamping blocks and the clamping member having co-operating angular faces, and a double threaded screw in the recess passing through the clamping blocks and engaging correspondingly threaded bores therein, the screw having a head accessible at one end of the recess and near an end of the body.

2. A cutter head structure of the class described, comprising a long cutter body, a blade abutment therein, a cutter blade of a length substantially equal to the length of the body and in facial contact with the abutment, a clamping bar having a long contact with the other face of the blade, the body being provided with a recess parallel to the clamping bar, and two sets of clamping devices located in the recess, each set comprising a pair of longitudinally movable wedge blocks having wedge members cooperating with similar members on the clamping bar, and a screw having oppositely threaded portions engaging correspondingly threaded bores in the wedge blocks, the screws of the two clamping devices having heads accessible at opposite ends of the cutter body whereby a long blade may be clamped at a multiplicity of points by manipulation of only two operating members and without longitudinal movement of the screws.

Signed at Laurel, in the county of Jones and State of Mississippi, this 21st day of October, A. D. 1922.

JAMES B. HUNT.